Jan. 2, 1934.    M. WALTER    1,941,645
DIFFERENTIAL GEARING FOR MOTOR VEHICLES
Filed Sept. 22, 1932

INVENTOR.
Maurice Walter,
BY
Redding, Greeley, O'Shea & Campbell
HIS ATTORNEYS

Patented Jan. 2, 1934

1,941,645

UNITED STATES PATENT OFFICE 1,941,645

DIFFERENTIAL GEARING FOR MOTOR VEHICLES

Maurice Walter, New York, N. Y., assignor to Walter Motor Truck Company, New York, N. Y., a corporation of New York Application September 22, 1932
Serial No. 634,295

6 Claims. (Cl. 74—99)

This invention relates to improvements in differential gearing of the general type set forth in Letters Patent of the United States No. 1,164,770 dated December 21, 1915. The principal object of the invention is to improve the gear elements so as to increase the capacity of differential gears of the type set forth in said patent without actually enlarging the units or sacrificing compactness. A further object of the invention is to provide in combination with the driven elements of differential gearing of the type set forth an improved thrust bearing which, while operative to take the thrust of either one of the final driven worm gears is slightly yielding to cushion the thrust.

The improved gear elements which are peculiarly adapted for use in differential gearing of the type with which the invention is concerned are of such form as to lend themselves to such gearing and yet increase appreciably the capacity thereof by an increase of the contact area between teeth. Worm or helical gears such as are disclosed in said prior Patent No. 1,164,770 necessarily bear such an interrelationship as to result in substantially point contacts between the teeth and resulting high unit pressure. In accordance with the present invention such helical gears have essentially two sections comprising, as to each gear, two sets of concave or formed teeth. Such formed teeth assure relatively large contact area as between each two mating gears thereby reducing appreciably the unit pressure and increasing the capacity of the assembly without, however, sacrificing compactness. This is particularly important in differentials of the type under consideration because each such helical gear is constantly in mesh with another helical gear and with the driven worm on a jack shaft.

In further increasing the capacity of the improved gearing there is interposed between the two driven worms a thrust plate against which either one of the worms may bear at a time depending on the worm subject to thrust and this improved thrust plate is of such construction as to yield slightly under such thrust to cushion the shock which is characteristic of worm gearing.

The invention will be described more fully in connection with the embodiment shown in the accompanying drawing, in which.

Figure 1:
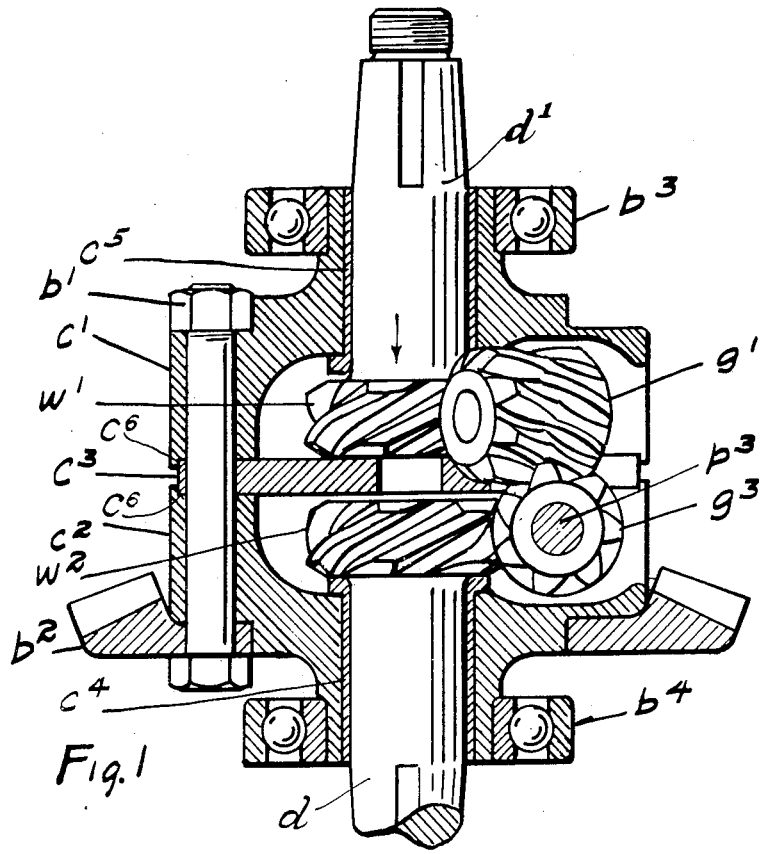
Figure 1 is a view in longitudinal section through the improved differential and showing the relationship between the helical gears of a pair and the relationship of the improved thrust plate to the driven worms.

The housing for the differential comprises two sections $c'$, $c^2$ between which is interposed the improved thrust plate $c^3$, all of the parts being united by bolts $b'$. The proximate edges of the sections $c'$, $c^2$, may be shouldered as indicated at $c^6$ to receive the thrust plate $c^3$ as a centering member to facilitate assembly. Plain bearings $c^4$, $c^5$, are provided in the sections $c^2$, $c'$, respectively, for the aligned jack shafts $d$, $d'$, respectively. Bearings $b^3$, $b^4$, may be associated with the sections of the housing. The jack shafts $d$, $d'$, carry the driven worms $w^2$, $w'$, respectively, these worms with the jack shafts having a predetermined amount of end play as will appear clearly from Figure 1. Such end play is limited in one direction by contact with the thrust plate $c^3$ and in the other direction by contact with the bearings $c^4$, $c^5$ only one worm or the other being in contact with the thrust plate at a time depending on the direction of the thrust. The housing may be rotated by power applied to the bevel gear $b^2$ carried on the section $c^2$. The power applied to the housing is transmitted to the worms $w'$, $w^2$, by pairs of helical gears, one such pair being indicated by the reference character $g'$, $g^3$, and the other pair being indicated by the reference characters $g^2$, $g^4$. Each pair of the helical gears is intermeshed and each helical gear of a pair is enmeshed with one of the worms, the result being that the jack shafts $d^2$, $d'$, are driven with capacity for differential movement but with such positive coupling that undue acceleration of one shaft with respect to the other is prevented. This relationship is made clear in Patent No. 1,164,770. For purposes of this description the helical gears $g'$, $g^3$, will be described, it being understood that one or more other pairs of such helical gears will bear the same relationship. The gear $g'$ is mounted on a pin $p'$ secured within the section $c'$ and the mating helical gear $g^3$ is mounted on a pin $p^3$ which is secured within the section $c^2$ in displaced angular relation to the pin $p'$. The gear $g'$ meshes with worm $w'$ while the gear $g^3$ meshes with the worm $w^2$ and the two pinions $g'$, $g^3$ mesh with one another. Each gear $g'$, $g^3$, has its teeth $g^5$ so formed as to comprise essentially two sets of teeth of concave form illustrated in Figure 3 as $g^6$, $g^7$. These concave or formed teeth mesh independently, in effect, with the mating teeth, that is to say, one set of teeth $g^6$ may engage the teeth of the worm $w^2$, while the other set of teeth $g^7$ on the same helical pinion may engage one set of such teeth on the mating pinion $g'$. By reason of the formed section the contact area is appreciable and the unit pressure is low. The transmitting capacity is correspondingly raised for a pinion of given size. While it will be apparent that the concave sections $g^6$, $g^7$, of a given tooth merge adjacent the midpoint of the pinion it will be convenient to regard these sections as independent sets of teeth functionally. In this sense, each helical pinion has two sets of teeth.

Figures 2, 3:
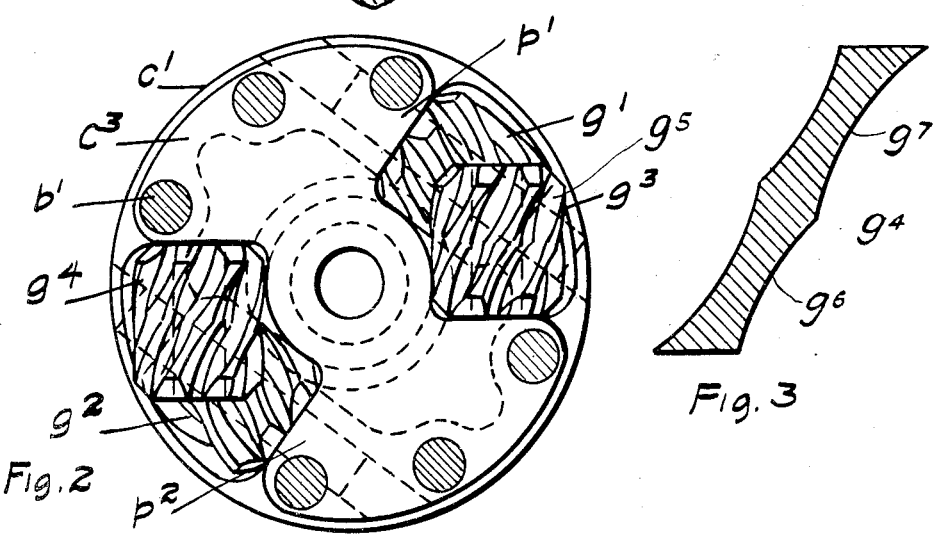
Figure 2 is a transverse view through the differential shown in Figure 1 with one section of the housing removed.
Figure 3 is a view in section of a tooth of one of the improved helical gears, showing its developed form.

Referring now to the thrust plate $c^3$ the worm $w'$ is shown as bearing against it in Figure 1. The form of the thrust plate is shown in Figure 2. It is preferably made of steel and is adapted to yield slightly under the thrust of the worms so as to cushion the initial shock characteristic of a worm operation. The thrust plate $c^3$, however, will not yield to such an extent as to impress the thrust of the worm $w'$ on the other worm $w^2$. On the contrary, the thrust is impressed on the housing of the differential and the benefit of the cushioning action of the yielding plate is thus assured.

What I claim is:

1. In a differential gearing, a rotatable housing, two driven worms mounted therein, and driving connections between the housing and the worms, said connections including two helical gears each with continuous teeth, each of said teeth having two concave contact surfaces, means to support the helical gears in the housing in mesh with each other and, severally, with the respective worms, and with the axes of the helical gears one in advance of the other about the axis of the driven worms.

2. In a differential gearing, a rotatable housing, two driven worms mounted therein, and driving connections between the housings and the worms, said connections including a plurality of pairs of intermeshed helical gears, each helical gear having continuous teeth, each of said teeth having two concave contact surfaces, means to support said pairs of helical gears in the housing and in mesh with each other, respectively, and, severally, with the respective worms and with the axes of said helical gears one in advance of the other about the axis of the driven worms.

3. In a differential gearing, a rotatable housing, two driven worms mounted therein, a yielding thrust plate disposed between said worms and normally in spaced relation therewith but engaged by one of said worms under axial thrust, and means to drive said worms.

4. In a differential gearing, two driven worms, a housing for the gearing parting in a plane transverse to the axes of said worms, a yielding thrust plate interposed between said worms and engaged by the sections of said housing, and means to secure the sections of the housing and thrust plate together.

5. In a differential gearing, two driven worms, a housing for the gearing parting in a plane transverse to the axes of said worms, a yielding thrust plate interposed between said worms and engaged by the sections of said housing, said sections of the housing being formed at their edges with aligned recesses to receive the thrust plate whereby the sections are centered upon assembly by said plate, and means to secure the sections of the housing and thrust plate together.

6. In a differential gearing, a rotatable housing, two driven worms mounted therein, two helical gears in mesh with one another and, severally, with the two worms and continuous teeth on said helical gears each of said teeth having two concaved contact surfaces, one set of teeth on each such gear contacting with the contact surfaces of the worm gear, and the other set of contact surfaces engaging one set of contact surfaces of the other helical gear.

MAURICE WALTER.